United States Patent [19]

Reine et al.

[11] 3,936,637
[45] Feb. 3, 1976

[54] THERMALLY STIMULATED DETRAPPING OF CHARGED CARRIERS IN CRYOGENIC PHOTOCONDUCTIVE MATERIAL

[75] Inventors: Marion B. Reine, Wellesley; Ralph A. Rotolante, Acton, both of Mass.

[73] Assignee: Honeywell Inc., Minneapolis, Minn.

[22] Filed: May 13, 1974

[21] Appl. No.: 469,266

[52] U.S. Cl. ............................................ 250/352
[51] Int. Cl.² ........................................ G01D 1/00
[58] Field of Search ............................ 250/352, 338

[56] References Cited
UNITED STATES PATENTS

| | | | |
|---|---|---|---|
| 3,457,409 | 7/1969 | Shenker et al. | 250/352 |
| 3,597,614 | 8/1971 | Bishop et al. | 250/352 X |

Primary Examiner—Davis L. Willis
Attorney, Agent, or Firm—David R. Fairbairn; John S. Munday

[57] ABSTRACT

A photoconductive detector is formed in a single body of semiconductor material and is used for sensing electromagnetic radiation, such as infrared radiation. The photoconductive body has a cooling means proximate that body for maintaining the body at a predetermined quiescent temperature and also has output means connected to the body for receiving a signal from the body. Further included are heating means proximate said photoconductive body and adapted to heat the photoconductive body to a temperature above said quiescent temperature for a time sufficient to accelerate decay of the radiation produced signal.

13 Claims, 7 Drawing Figures

THERMALLY STIMULATED DETRAPPING OF CHARGED CARRIERS IN CRYOGENIC PHOTOCONDUCTIVE MATERIAL

BACKGROUND OF THE INVENTION

The invention herein described was made in the course of or under a contract, or subcontract thereunder with the Department of the Army.

When radiation of the proper energy falls upon a photoconductive semiconductor, the conductivity of the semiconductor increases. Energy supplied to the semiconductor causes covalent bonds to be broken, and electronhole pairs in excess of those generated thermally are created. These increased current carriers decrease the resistance of the material. This "photoconductive effect" in semiconductor materials is used in photoconductive detectors.

A photoconductive detector is a bar of semiconductor material having electrical contacts at the ends. In its simplest form, the photoconductive detector is connected in series with a direct current voltage source and a load resistor. The change in resistivity of the photoconductive detector in response to incident radiation is sensed in one of two ways. If the resistance of the load resistor is much greater than the resistance of the detector, the device is operated in the "constant current mode," since the current through the detector is essentially constant. In this mode, the change in resistivity of the photoconductive detector is usually sensed by measuring the change in voltage across the photoconductive detector.

If, on the other hand, the resistance of the load resistor is much less than the resistance of the detector, the photoconductive detector is operating in the "constant voltage mode" since the voltage across the photoconductive detector is essentially constant. The change in resistivity of the photoconductive detector is usually sensed by measuring the voltage change across the load resistor.

Of the two detector modes, the constant current mode finds wider use in photoconductive detectors made from semiconductor materials having low resistivity. For this reason, further discussion in this specification will deal with the constant current mode rather than the constant voltage mode.

Photoconductive detectors have found many applications. One particularly important area is in the detection of infrared radiation. Infrared sensing photoconductive detectors are widely used for various heat and object sensing applications.

One widely used intrinsic infrared sensitive photodetector material is mercury cadmium telluride, which consists of a mixture of cadmium telluride and mercury telluride. Cadmium telluride is a wide gap semiconductor ($E_g$=1.6eV), and mercury telluride is a semimetal having a "negative energy gap" of about −0.3eV. The energy gap of the alloy varies linearly with $x$, the mole fraction of cadmium telluride in the alloy, $Hg_{1-x}Cd_xTe$. By properly selecting $x$, it is possible to obtain mercury cadmium telluride detector materials having a peak response at any of a wide range of infrared wavelengths. Of particular importance are those wavelengths in the 8 to 14 micron range.

When signal producing radiation impinges upon a photoconductive body, a signal is produced from the resultant flow of electrons. The photoconductive gain is equivalent to the number of times an electron passes through the circuit before the electron recombines with one of the holes created. This length of time while the electron is passing through the circuit is known as a recombination time, generally defined as how long the electron will travel before it recombines with a hole. This recombination time is directly related to the temperature of the semiconductor. In many semiconductors, and in particular, with mercury cadmium telluride, it is necessary to operate the semiconductor at a cryogenic temperature of, for example 3°K to 80°K in order to have a recombination time sufficient to achieve a usable photoconductive gain.

Materials such as mercury cadmium telluride which have extremely long photoconductive response times, on the order of 100 to 300 milliseconds, have not been found to be useful in certain applications because of this long recovery time. Many times, the photoconductive material is in an atmosphere where nuclear or gamma ray sources are present, either naturally or created artificially. Thus, nuclear interactions will swamp the detector and no useful output can be obtained. Since the detector must receive radiation from the source sought to be detected, it is impossible to completely shield the detector from unwanted nuclear radiation. In other instances, various objects are sought to be detected such as, for example, two closely spaced stars or other celestial bodies. If these two objects to be detected are too close together, the detector will still be reporting the signal of the first body when it begins to receive the radiation from the second body. Many times, the two signals either overload the detector or, in the case when the second body is significantly smaller than the first, the second signal is lost in the response from the first body's signal.

Accordingly, it would be of great advantage to the art if a semiconductor device could be created which would be sensitive, that is have long recombination times and therefore a high photoconductive gain, without the adverse effects of a long recombination time.

Another advantage would be if a detector could be provided which would be insensitive to background (nuclear) radiation of the type which produces more signals than can be effectively dissipated.

SUMMARY OF THE INVENTION

The present invention provides for a detector which is significantly more sensitive to sensing signal producing radiation which is closely spaced in incidence upon the detector by significantly shortening the time needed for decay of the radiation produced signal. Likewise, the present invention provides for a detector which can recover quickly from unwanted, nuclear interaction.

The photoconductive detector of this invention employs a heating means proximate the detector itself, which is adapted to heat the detector body to a temperature above the predetermined quiescent temperature at which the body is maintained for a sufficient time to accelerate the decay of radiation producing signals. This is accomplished by raising the temperature of the body to a point where the recombination time is substantially shorter than its value at the predetermined quiescent temperature. The invention is particularly suitable for use with semiconductors such as mercury cadmium telluride which are adapted to produce a signal upon incidence of infrared radiation. In those instances when a cooling means is provided to maintain the photoconductive body at a quiescent temperature ranging from as low as 3°K to 30°K, this invention contemplates the use of a voltage source means for applying a potential from less than one to more than ten volts across said body, thereby raising the temperature of the body to a temperature above the quiescent temperature for a sufficient time to accelerate decay of the radiation produced signal. Normally this time will range from less than three microseconds to more than three milliseconds, and can be induced by electronic switching, such as, for example, from a peak detector circuit which senses the signal peak from the signal producing portion of the detector apparatus. The signal may be produced from an amplifier and display the output visually on a screen in a conventional manner. Elimination of the decay time after the peak signal is recorded will permit identification of closely spaced signals generated by the photoconductive body.

The voltage source means for applying the heating pulse can also be induced by electronic switching, such as, for example, from a discriminator which senses the very fast rise in signal from an unwanted, nucleartype interaction. Immediate application of the heating pulse will totally eliminate the unwanted signal.

The invention and its many features will become apparent from the following description and the appended drawings, in which:

DESCRIPTION OF THE INVENTION

Figure 1:
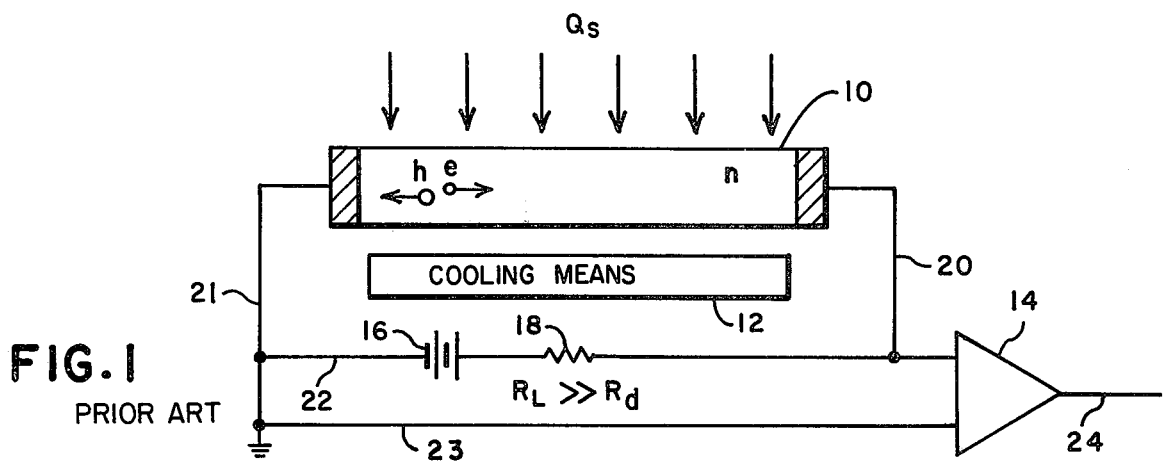
FIG. 1 shows a prior art photoconductive detector.

As shown in FIG. 1, the photoconductive detector is a body of N-type semiconductor material 10. This material may be any semiconductive material which produces a signal upon incidence of signal producing radiation through the formation of an electron and hole pair in the manner described. Particularly useful semiconductor materials are those which are sensitive to infrared radiation, such as mercury cadmium telluride. Mercury cadmium telluride and other similar semiconductor materials are described in the prior art. Specific descriptions may be found in U.S. Ser. No. 393,264, filed Aug. 30, 1973, and U.S. Ser. No. 420,175, filed Nov. 29, 1973, commonly owned.

Battery 16 and resistor 18 are connected in series with the detector 10 through lines 20 and 21. The change in resistivity with incident radiation is sensed by measuring the voltage across detector 10. Amplifier 14 amplifies this voltage to produce an output signal through line 24. The radiation flux $Q_s$ received by the photoconductive detector 10 creates electron-hole pairs. The hole is designated by $h$ and the electron by $e$. Line 23 represents a ground line. Cooling means 12 maintains the temperature of the body 10 at a predetermined quiescent temperature.

Figure 2:
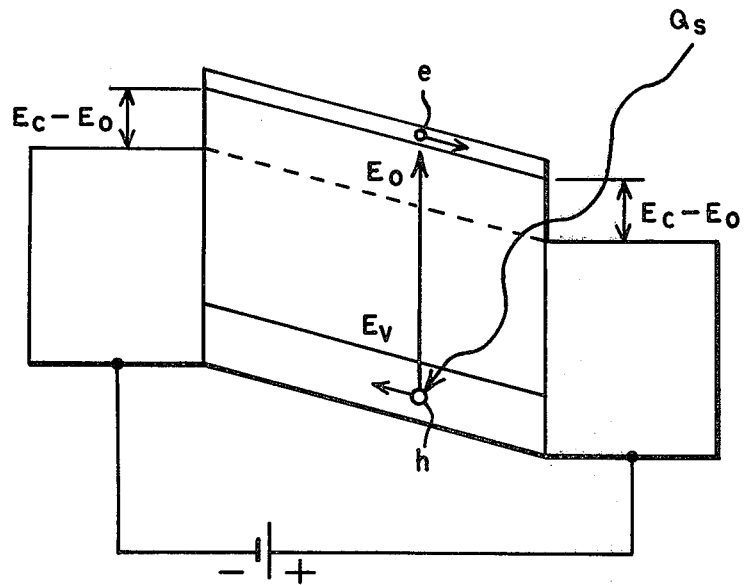
FIG. 2 is an energy level diagram of the photoconductive detector of FIG. 1.

FIG. 2 shows a schematic energy level diagram of the detector of FIG. 1, and an N-type semiconductor having ohmic contacts at both ends with a potential applied between the contacts. When a signal photon in the incident photon flux $Q_s$ is absorbed in the semiconductor material, an electron-hole pair is created. These excess carriers are not distinguishable from thermal equilibrium carriers. The excess carriers drift with the applied field, until recombination takes place. The magnitude of the photosignal depends primarily upon the number of electron-hole pairs created per signal photon (quantum efficiency), the length of time these excess carriers are available for the excess conduction process, and the background carrier concentration.

In principle, therefore, the photosignal can be increased by simply extending the time that the excess carriers are available for the conduction process. This can be accomplished by introducing impurity or native defects that act as minority carrier traps in the semiconductor material. FIG. 2 schematically shows the conduction and valence band of a photoconductive material having minority carrier traps. Immediately after the electron-hole pair is created, an electron from the defect center traps the excess hole. In other words, the hole is raised to the defect level. Since the hole is now localized at the trap level, there is a low probability that the excess electron will recombine with the hole until the hole is re-emitted from the trap to the valence band. The time required for the hole to be re-emitted increases the time that the excess electron is available in the conduction process, thus increasing the photosignal by increasing the photoconductive gain. Under the proper conditions, this increase in time and signal can be many orders of magnitude. Generally, the lower the temperature of operation, at the quiescent state, the greater the magnification of gain.

Figure 3:
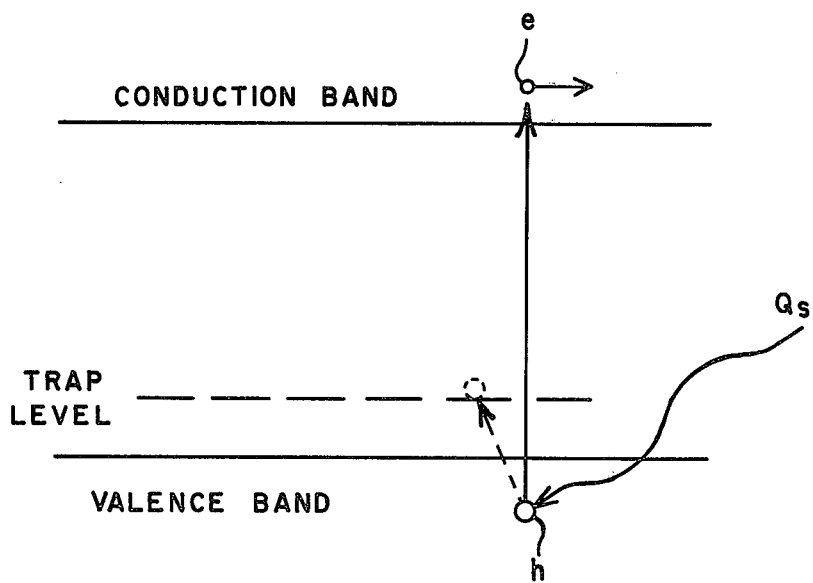
FIG. 3 is an energy level diagram of a photoconductive detector utilizing minority carrier trapping.

FIG. 3 represents the movement of an electron hole to the trap level upon incidence of a signal photon flux $Q_s$.

Figure 6:
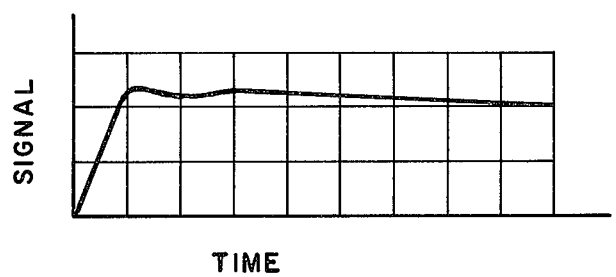
FIG. 6 is a reproduction of an actual output from a photoconductive detector of the type shown in FIG. 1.

Thus, for effective operation of a photoconductive device, and the increasing of photoconductive gain, the optimization of this process involves the use at a low predetermined quiescent temperature, such as from approximately 3°K to 30°K in the case of mercury cadmium telluride, or other infrared sensitive semiconductors, and results in a significantly long photoconductive response time, in the order of 100 to 300 milliseconds. The result of using such a device is that a significantly detectable signal is produced by the incidence of signal producing radiation. This signal is then passed on to an output means connected to the semiconductor body for receiving a signal from the semiconductor itself. Normally, as has been described, the output means includes an amplifier means for amplifying the signal and a display means for visually reproducing this signal. FIG. 6 represents the display of a signal received by a semiconductor means of the type shown in FIG. 1. An extremely fast rise of signal is noted on the left hand portion of the curve, followed by an extremely long (in relation to the rise time) decay time shown by the essentially parallel tapering line flowing from left to right in the drawing. This particular signal required approximately 500 milliseconds to decay.

Figure 4:
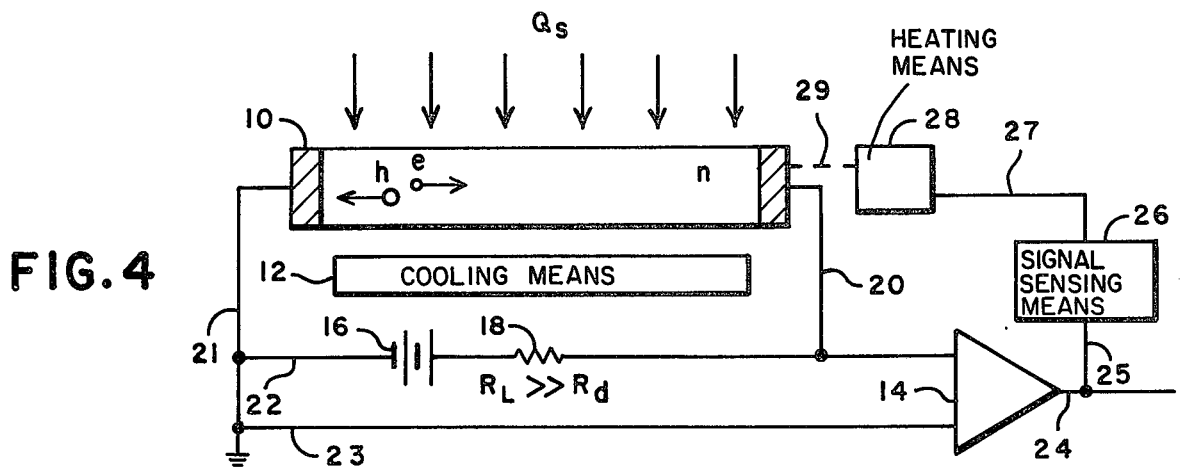
FIG. 4 is a schematic diagram of a photoconductive detector employing the present invention.

Shown in FIG. 4 is a semiconductor device which has been modified by the present invention. Again there is a semiconductor body 10 in series with a battery 16 and a load resistor 18, connected through lines 20 and 21. Cooling means 12 is provided to maintain the body 10 at a predetermined quiescent temperature sufficient to provide an adequate photoconductive gain whereby a proper signal may be received by the output means. The cooling means 12 is positioned to maintain the body 10 at a predetermined quiescent temperature which is most effective in lengthening the recombination time. In the case where the body is of a material which requires extremely low temperature, conventional cooling means may be used to maintain the temperature as low as 3°K. Reference is hereby made to the text, *Handbook of Infrared Technology*, by Paul W. Kruse et al., 1962, John Wyley & Sons, Inc. Particular attention should be drawn to pages 393 through 398, which describe methods for maintaining semiconductor bodies at low temperature.

Incidence of radiation in the form of a signal photon flux $Q_x$ again produces electron-hole pairs, wherein the hole is shown by $h$ and the electron is shown by $e$. Again the system is grounded in line 23. Also described in FIG. 4 is a heating means. This heating means includes a means responsive to the production of a signal in line 24 from amplifier 14 and is connected to line 24 through line 25. This signal sensing means 26 detects the production of a signal by the semiconductor 10 upon incidence of a signal photon flux $Q_s$ and passes this information through line 27 to heating means 28. The heating means 28 then causes the temperature of the semiconductor 10 to rise through line 29 to a temperature above the quiescent temperature for a time sufficient to accelerate the decay of the radiation produced signal.

Figure 5:
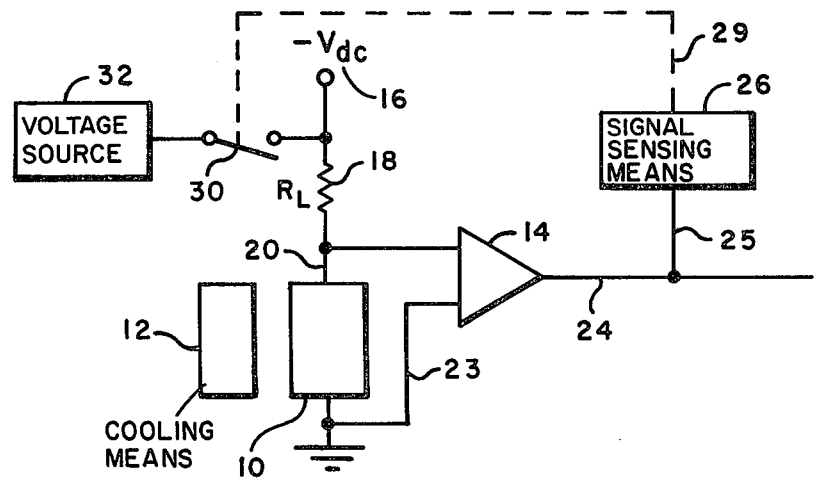
FIG. 5 is a schematic diagram of a photoconductive detector employing the preferred embodiment of the present invention.

Shown in FIG. 5 is an apparatus employing the present invention which represents the preferred embodiment. A detector 10 is positioned adjacent to a cooling means 12 for maintaining the body 10 at a predetermined quiescent temperature. In the case of mercury cadmium telluride or other infrared detectors, this temperature may range from 3°K to 30°K. Incidence of signal producing radiation upon the detector 10 results in a signal which passes to output means 14, in this case an amplifier, through line 20. The output signal is sent to a display means (not shown) via line 24. Line 23 grounds the amplifier and detector means. A peak detector circuit 26 is connected to output line 24 via line 25 to sense the production of a signal through incidence of signal producing radiation on the body 10. When the peak detector identifies a voltage peak, indicative of production of a signal, a signal is passed via line 29 to switch 30. Closing of the switch 30 permits the applying of a potential of from one to ten volts across the body 10 derived through voltage source 32. Normally, a biasing voltage from voltage source 16 and load resistance 18 has maintained the conductor in a constant current mode. This potential from voltage source 32 is applied across the body 10 for sufficient time to raise the temperature of the body 10 above the quiescent temperature and accelerate decay of the radiation produced signal by detrapping holes and substantially shortening the recombination time. Normally, this voltage need only be applied for a very short period of time, in the order of 3 to 30 microseconds. The constant cooling means 12 is sufficient to reduce the temperature of the body back to the predetermined quiescent temperature in an extremely short time so that the entire time for decay of the signal produced by incidence of radiation is in the order of 100 microseconds to 3 milliseconds. Thus the detector is ready and available to receive a new signal in less than 3 milliseconds, significantly shorter in time than the greater than 200 milliseconds of the prior art.

Figure 7:
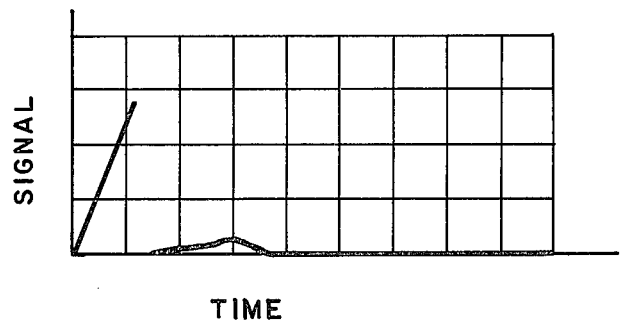
FIG. 7 is a reproduction of an actual output of a photoconductive detector employing the invention as shown in FIG. 5.

Shown in FIG. 7 is a reproduction of an actual output from a device as shown in FIG. 4 and in FIG. 5. As can be seen, on the extreme left hand portion of the curve a voltage indicating the production of a signal after receipt of radiation causing such signal gives rise to a displayed signal. Simultaneously, the peak detector 26 has noticed the voltage peak and operates the switch 30 to apply a potential across the body 10 from voltage source 32. This voltage applied for an extremely short period of time, less than 30 microseconds, causes decay of the signal by decreasing the recombination time for the electron. Thus the display screen shows no signal after an extremely short period, in the order of one microsecond. When the detector is subjected to two closely spaced radiation signals, a second signal as shown in the rising portion of the middle left hand side of FIG. 7 will also be detected and it is readily discernible as being different from the first source. Comparison of the readily discernible second signal in FIG. 7 with the hardly discernible wiggle in the middle of the line from FIG. 6 clearly shows that the detector is now capable of clearly identifying two closely spaced sources of signal producing radiation, whereas the prior art detector was unable to make such a distinction due to the long decay time of the detector.

Likewise, in FIG. 5, logic 26 can be a fast-rise discriminator. Thus, when a fast-rise signal, indicative of unwanted, nuclear-type interaction, is indicated, the pulse to close switch 30 can be immediately closed. In that manner, the heating pulse will virtually eliminate the unwanted signal.

Having thus described the invention, what is claimed is:

1. In a detector having a photoconductive body, cooling means for maintaining said body at a predetermined quiescent temperature, and output means for receiving a signal from said body upon incidence of signal producing radiation, the improvement comprising:
   heating means responsive to said output means for heating said body to a temperature and for a time sufficient to accelerate decay of said radiation produced signal.

2. The detector of claim 1, wherein said heating means includes voltage source means for applying a potential of several volts to said body.

3. The detector of claim 2, wherein said heating means further includes a fast rise discriminator means for sensing said signal in said output means, and switching means for activating said voltage source means for from less than 3 to 30 microseconds upon receipt of said signal by said discriminator means.

4. The detector of claim 3, wherein said heating means further includes a peak detection means for sensing said signal in said output means and switching means for activating said voltage source means for from less than 3 to 30 microseconds upon receipt of said signal by said peak detector means.

5. A detector for sensing signal producing radiation comprising:
   a photoconductive body means for producing a signal upon incidence of signal producing radiation;
   cooling means proximate said body means for maintaining said body means at a predetermined quiescent temperature;

output means connected to said body means for receiving a signal from said body means; and heating means proximate said body means for heating said body means to a temperature above said quiescent temperature for a time sufficient to accelerate decay of said radiation produced signal.

6. The detector of claim 5, wherein said photoconductive means produces a signal upon incidence of infrared radiation.

7. The detector of claim 6, wherein said photoconductive body includes a mercury cadmium telluride body.

8. The detector of claim 7, wherein the quiescent temperature ranges from about 3°K to about 30°K.

9. The detector of claim 8, wherein said output means includes amplifier means for amplifying said signal.

10. The detector of claim 9, wherein said output means further includes display means for visually reproducing said signal.

11. The detector of claim 8 wherein said heating means includes voltage source means for applying a potential of several volts across said body.

12. The detector of claim 11, wherein said heating means further includes a fast rise discriminator means for sensing said signal in said output means, and switching means for activating said voltage source means for from less than 3 to 30 microseconds, upon receipt of said signal by said discriminator means.

13. The detector of claim 11, wherein said heating means further includes a voltage peak detector means for sensing said signal in said output means, and switching means for activating said voltage source means for from less than 3 to 30 microseconds, upon receipt of said signal by said peak detector.

* * * * *